(12) United States Patent
Wu et al.

(10) Patent No.: US 9,212,093 B2
(45) Date of Patent: Dec. 15, 2015

(54) HYBRID MAGNESIUM CEMENT AND METHOD OF MANUFACTURE

(75) Inventors: Hwai-Chung Wu, Ann Arbor, MI (US); Kraig Warnemuende, Canton, MI (US)

(73) Assignees: NTH Consultants, Ltd., Northville, MI (US); Wayne State University, Detroit, MI (US)

( * ) Notice: Subject to any disclaimer, the term of this patent is extended or adjusted under 35 U.S.C. 154(b) by 385 days.

(21) Appl. No.: 13/533,520

(22) Filed: Jun. 26, 2012

(65) Prior Publication Data

US 2013/0000520 A1   Jan. 3, 2013

Related U.S. Application Data

(60) Provisional application No. 61/503,228, filed on Jun. 30, 2011.

(51) Int. Cl.
| | |
|---|---|
| *C04B 9/00* | (2006.01) |
| *C04B 14/28* | (2006.01) |
| *C04B 12/02* | (2006.01) |
| *C04B 28/00* | (2006.01) |
| *C04B 28/34* | (2006.01) |
| *C04B 111/00* | (2006.01) |

(52) U.S. Cl.
CPC .............. *C04B 12/027* (2013.01); *C04B 28/008* (2013.01); *C04B 28/34* (2013.01); *C04B 2111/00163* (2013.01); *C04B 2111/00172* (2013.01); *Y02W 30/92* (2015.05); *Y02W 30/94* (2015.05)

(58) Field of Classification Search
CPC .................................. C04B 9/00; C04B 14/28
USPC ........................................ 106/690, 789, 801
See application file for complete search history.

(56) References Cited

U.S. PATENT DOCUMENTS

| | | | |
|---|---|---|---|
| 6,458,423 B1 | 10/2002 | Goodson | |
| 6,969,422 B2 * | 11/2005 | Mazany et al. | ............... 106/600 |
| 7,094,285 B2 * | 8/2006 | Mazany et al. | ............... 106/600 |
| 2005/0016421 A1 | 1/2005 | Fujimori et al. | |
| 2010/0006288 A1 | 1/2010 | Santra et al. | |

FOREIGN PATENT DOCUMENTS

| | | |
|---|---|---|
| JP | 09-165272 A | 6/1997 |
| JP | 2009-007202 A | 1/2009 |
| WO | 2010-024497 A1 | 3/2010 |

OTHER PUBLICATIONS

International Search Report mailed Jan. 31, 2013 in PCT/US2012/044333 filed Jun. 27, 2012, Applicant: Wayne State University, 4 pgs.

\* cited by examiner

*Primary Examiner* — Paul Marcantoni
(74) *Attorney, Agent, or Firm* — Brooks Kushman P.C.

(57) ABSTRACT

A hybrid magnesium cement composition formed of an A-side and a B-side. The A-side having an A1-component including a light-burn grade magnesium-containing material, and an A2-component including a non-metallic oxide salt. A B-side having a metal silicate polymer is included.

4 Claims, 2 Drawing Sheets

HYBRID MAGNESIUM CEMENT AND METHOD OF MANUFACTURE

CROSS-REFERENCE TO RELATED APPLICATION

This application claims the benefit of U.S. provisional application Ser. No. 61/503,228 filed Jun. 30, 2011, which is incorporated in its entirety herein by reference.

STATEMENT REGARDING FEDERALLY SPONSORED RESEARCH OR DEVELOPMENT

The invention was made with Government support under Contract No. IIP-1113525. The Government has certain rights to the invention.

TECHNICAL FIELD

This application relates to a hybrid magnesium cement and a method of manufacture of same.

BACKGROUND OF THE INVENTION

Portland cement has been used in concrete for nearly two centuries. But, Portland cement generally requires energy-intensive production facilities sufficient to process limestone at 2,000° F. in mammoth kilns. About one pound of carbon dioxide is released to the atmosphere for every pound of Portland cement produced. While Portland cement is used in many concrete structures, Portland cement also contributes significantly to decay of installed infrastructure as Portland cement deteriorates, especially due to attack from chloride ions.

Magnesium cement is suitable as a substitute for Portland cement. At present, magnesium cements are derived from magnesium oxide and are therefore relatively costly and relatively complicated products. Marketed products involving magnesium cement are primarily limited to the interior wall applications, such as magnesium oxychloride cement boards. Magnesium oxychloride cement experiences a strength loss when wet as a result of leaching of magnesium chloride and other chloride components. Another magnesium cement, magnesium oxysulfate cement, also loses strength when wet because it still has a relatively significant magnesium chloride component. Such strength reduction is a major obstacle to other structural uses of magnesium cement. Other magnesium cements provide high performance, but have limited raw material supplies, cannot be wet-cured, and are otherwise ten-fold more expensive than Portland cement.

A more sustainable material is needed to replace Portland cement, especially a material has superior mechanical properties and duty life, especially in wet duty service, while being reasonably priced.

SUMMARY OF THE INVENTION

In at least one embodiment, a hybrid magnesium cement composition is formed of an A-side having an A1-component including a light-burn grade magnesium-containing material, and an A2-component including a non-metallic oxide salt. A B-side having a metal silicate polymer is included.

In at least one embodiment, a method of manufacture of a hybrid magnesium cement composition includes calcining a magnesium-containing material at a temperature in a range of 770° C. to 1,100° C. for a time period ranging from 0.2 hr to 2.5 hr to form a light-burn grade magnesium-containing material (LGBM). The method also includes mixing the LGBM with a non-metallic oxide salt to form a magnesium-oxide-non-metallic oxide salt (MONMO) inorganic polymer. The MONMO is mixed with a metal silicate polymer to form a dry hybrid magnesium-containing composition.

In another embodiment, a light-burn grade magnesium-containing material (LGBM) composition includes calcium carbonate present in the range of 30 wt. % to 70 wt. % of the LGBM, calcium oxide in an amount less than 10 wt. % of the LGBM, magnesium carbonate in an amount less than 25 wt. % of the LGBM, and magnesium oxide present in an amount ranging from 18 wt. % to 70 wt. % of the LGBM. The composition totals 100 wt. % of the LBGM, excluding other components.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any claims and/or as a representative basis for teaching one skilled in the art to variously employ the present invention.

Except in examples, or where otherwise expressly indicated, all numerical quantities in this description used to indicate amounts of material or dimensions are to be understood as modified by the word "about" in describing the broadest scope of the invention. Practice within the numerical limits stated is generally preferred. Also, unless expressly stated to the contrary: the description of a group or class of materials as suitable or preferred for a given purpose in connection with the invention implies that mixtures of any two or more the members of the group or class are equally suitable for preferred; the first definition of an acronym or other abbreviation applies to all subsequent uses herein of the same abbreviation and applies mutatis mutandis to normal grammatical variations of the initially defined abbreviation; and, unless expressly stated to the contrary measurement of a property is determined by the same technique as previously or later referenced for the same property. Also, unless expressly stated to the contrary, percentage, "parts of," and ratio values are by weight, and the term "polymer" includes "oligomer," "copolymer," "terpolymer," "pre-polymer," and the like.

A hybrid magnesium cement, in at least one embodiment, is formed by mixing a Part A: a magnesium-containing material that includes magnesium oxide with a Part B: a metal silicate polymer. Before mixing to form the hybrid magnesium cement, the magnesium-containing material and the metal silicate polymer are each partially reacted separately, forming a partially-cured magnesium-containing material and a partially-cured metal silicate polymer. Part A is a mixture of a Part A1: a light-burn grade magnesium-containing material, and a Part A2: a non-metallic oxide salt.

Figure 1:
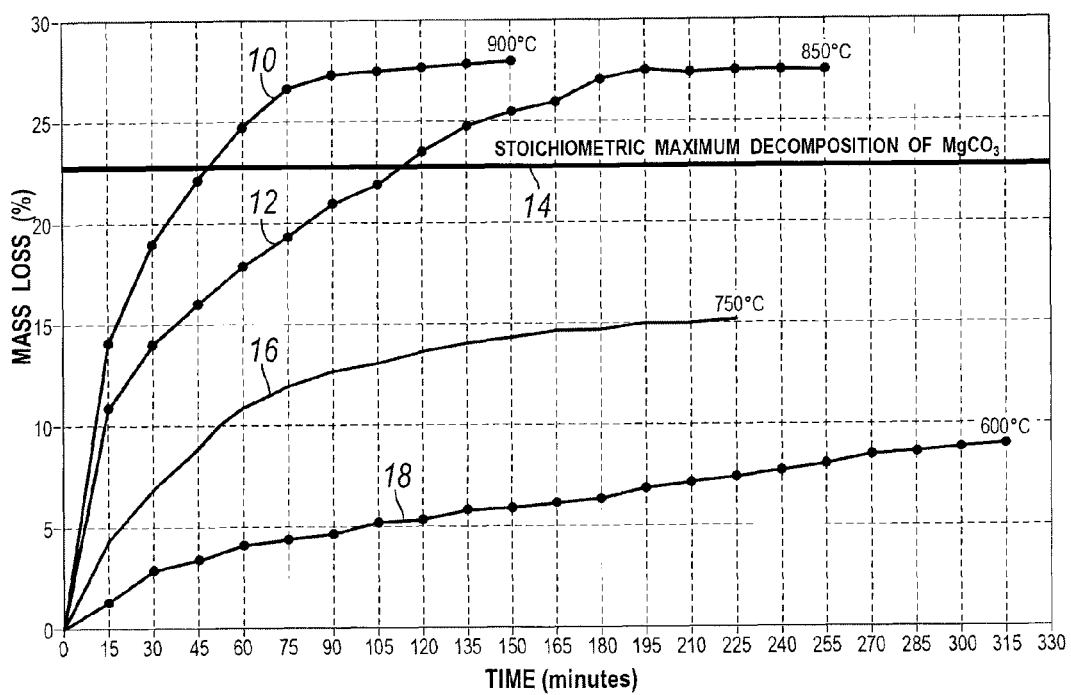
FIG. 1 graphically illustrates a time versus temperature graph of calcining of magnesium-containing materials according to at least one embodiment.

Turning now to FIG. 1, a time versus weight loss graph is shown of calcining of the magnesium-containing material according to at least one embodiment. In the embodiments of FIG. 1, a dolomite is the magnesium-containing material. At line 10 is the weight loss trace of calcining the dolomite at 900° C. The weight loss equivalent to the stoichiometric amount of carbon dioxide from the decomposition of magnesium carbonate in the dolomite to magnesium oxide is reached in approximately 45 minutes. Faster temperature rise favors maximizing converting only magnesium carbonate and not calcium carbonate in the dolomite which is preferable for later forming a magnesium-oxide-non-metallic oxide salt inorganic polymer (MONMO), a magnesium-containing cement mortar, a partially-cured magnesium-containing cement mortar, and the hybrid magnesium cement. Faster processing of the dolomite to the stoichiometric maximum loss of carbon dioxide, line 14 of FIG. 1, from the decomposition of magnesium carbonate is advantageous from a manufacturing cost perspective with less energy used and a better utilization rate of a calciner relative to a longer calcining time with a conventional Portland cement calcining operation. At line 12 is the weight loss trace of calcining the dolomite at 850° C. The loss of the stoichiometric amount of carbon dioxide from the decomposition of magnesium carbonate in the dolomite to magnesium oxide is reached in approximately 115 minutes. At line 16 is the weight loss trace of calcining the dolomite at 750° C. The loss of the stoichiometric amount of carbon dioxide from the decomposition of magnesium carbonate in the dolomite to magnesium oxide is not achieved. At line 18 is the weight loss trace of calcining the dolomite at 600° C. The loss of the stoichiometric amount of carbon dioxide from the decomposition of magnesium carbonate in the dolomite to magnesium oxide is never achieved. It should be understood that in other embodiments using different materials and equipment, other temperature settings may achieve the maximum stoichiometric decomposition of magnesium carbonate. It is also understood that other temperature and equipment combinations may achieve hybrid cements having lesser, but still acceptable, performance properties for the intended use.

It is understood that there are substantial variations in magnesium, calcium, and contaminant amounts in naturally occurring dolomite. In a nominal dolomite, calcium is present in an amount of 54.3 wt. % $CaCO_3$ and magnesium is present in an amount of 45.7 wt. %. Dolomite variations from nominal contemplated within the scope of this invention include, but are not limited to, a calcitic dolomite, a dolomitic limestone, a magnesium limestone, a steel-melting-shop grade of dolomite, and a blast-furnace grade of dolomite.

In at least one embodiment the light-burn grade magnesium-material has a composition as shown in Table 1A, where the composition accumulates to 100%.

TABLE 1A

| COMPONENT | MINIMUM AMOUNT (%) | MAXIMUM AMOUNT (%) |
|---|---|---|
| $CaCO_3$ | 30 | 70 |
| CaO | 0 | 10 |
| $MgCO_3$ | 0 | 25 |
| MgO | 18 | 70 |
| Other | 0 | 12 |

In another embodiment the light-burn grade magnesium-material has a composition as shown in Table 1B, where the composition accumulates to 100%.

TABLE 1B

| COMPONENT | MINIMUM AMOUNT (%) | MAXIMUM AMOUNT (%) |
|---|---|---|
| $CaCO_3$ | 40 | 65 |
| CaO | 0.1 | 7.5 |
| $MgCO_3$ | 0 | 10 |
| MgO | 30 | 60 |
| Other | 0.1 | 7 |

In another embodiment the light-burn grade magnesium-material has a composition as shown in Table 1C, where the composition accumulates to 100%.

TABLE 1C

| COMPONENT | MINIMUM AMOUNT (%) | MAXIMUM AMOUNT (%) |
|---|---|---|
| $CaCO_3$ | 50 | 60 |
| CaO | 0.2 | 5 |
| $MgCO_3$ | 0 | 5 |
| MgO | 40 | 50 |
| Other | 0.1 | 7 |

In at least one embodiment, the weight ratio in the light-burn grade magnesium-containing material of $MgCO_3$ to MgO ranges from 0 to 0.71. In another embodiment, the weight ratio of the light-burn grade magnesium-containing material $MgCO_3$ to MgO ranges from 0.01 to 0.55. In yet another embodiment, the weight ratio of the light-burn grade magnesium-containing material $MgCO_3$ to MgO ranges from 0.05 to 0.20.

In at least one embodiment, in forming light-burn grade magnesium-containing material, essentially all $MgCO_3$ in the raw material is transformed by calcining into MgO as measured by weight between the initial dried material and the after-calcining, colled dried material. In another embodiment, in forming light-burn grade magnesium-containing material essentially all $MgCO_3$ in the raw material is transformed by calcining into MgO and essentially none of the $CaCO_3$ in the raw material is converted into CaO. In another embodiment, in forming light-burn grade magnesium-containing material essentially all $MgCO_3$ in the raw material is transformed by calcining into MgO and less than 20 rel. % of the $CaCO_3$ in the raw material is converted into CaO. In another embodiment, in forming light-burn grade magnesium-containing material essentially all $MgCO_3$ in the raw material is transformed by calcining into MgO and less than 10 rel. % of the $CaCO_3$ in the raw material is converted into CaO. In another embodiment, in forming light-burn grade magnesium-containing material at least 80 rel. % of $MgCO_3$ in the raw material is transformed by calcining into MgO and less than 20 rel. % of the $CaCO_3$ in the raw material is converted into CaO. In another embodiment, in forming light-burn grade magnesium-containing material at least 90 rel. % of $MgCO_3$ in the raw material is transformed by calcining into MgO and less than 20 rel. % of the $CaCO_3$ in the raw material is converted into CaO. In another embodiment, in forming light-burn grade magnesium-containing material at least 90 rel. % of $MgCO_3$ in the raw material is transformed by calcining into MgO and less than 10 rel. % of the $CaCO_3$ in the raw material is converted into CaO.

In at least one embodiment, the magnesium-containing material is the dolomite that is calcined to form a light-burn grade dolomite. The light-burn grade dolomite is calcined at temperature for a time period ranging from 0.2 hours to 2.5 hours. In another embodiment, the light-burn grade dolomite is a calcined at temperature for a time period ranging from 0.5 hours to 2 hours. In another embodiment, the light-burn grade dolomite is calcined at temperature for a time period ranging from 0.75 hours to 1.5 hours.

The magnesium-containing material, in at least one embodiment, is the light-burn grade dolomite formed by calcining a dolomite at a temperature ranging from 770° C. to 1,100° C. In another embodiment, the light-burn grade dolomite is formed by calcining the dolomite at a temperature ranging from 800° C. to 950° C. In yet another embodiment, the light-burn grade dolomite is formed by calcining the dolomite at a temperature ranging from 850° C. to 900° C. It was surprising that an exceptionally and unacceptably violent reaction occurs when the light-burn grade dolomite is calcined at temperatures at or above 1,100° C. and subsequently mixed with a non-metallic oxide salt.

In at least one embodiment, the mixture of light-burn grade dolomite with the non-metallic oxide salt forms a magnesium-oxide-non-metallic oxide salt inorganic polymer (MONMO). MONMO is reactable with the metal silicate polymer to form the hybrid cement in certain embodiments.

In at least one embodiment, the non-metallic oxide salt is a sulfate salt. In another embodiment, the non-metallic oxide salt is a phosphate salt.

In at least one embodiment, the phosphate salt is a soluble phosphate. In another embodiment, the phosphate is a crystalline phosphate. Non-limiting examples of the phosphate salt include metal dihydrogen phosphate, dimetal hydrogen phosphate, metal phosphate, where the metal is a monovalent metal cation, such as potassium. In another embodiment, the phosphate salt may include phosphate compositions having ammonium, alkaline earth and/or di- and/or trivalent metal cations.

In at least one embodiment, the weight ratio of the non-metallic oxide salt to the magnesium oxide in the light-burned grade dolomite ranges from 0.1 to 1.2. In another embodiment, the weight ratio of the non-metallic oxide salt to the magnesium oxide in the light-burned grade dolomite ranges from 0.3 to 1.1. In yet another embodiment, the weight ratio of the non-metallic oxide salt to the magnesium oxide in the light-burned grade dolomite ranges from 0.5 to 0.95. It is unexpected that the weight ratio of non-metallic oxide salt to magnesium oxide is significantly different from the stoichiometric ratio. Without being tied to any one theory, this unexpected result may arise from the broad distribution of particles sizes of the light-burn grade dolomite, where the large particle sizes do not receive all of the reactants during the relative short reaction time period.

Besides temperature and residence time in a calciner, the particle size may contribute to the magnesium-containing material's effectiveness in the hybrid cement. The particle size distribution of the dolomite, in at least one embodiment, has more than 85 wt. % being less than a Tyler Equivalent 100-mesh screen and less than 15 wt. % being less than a 4.8 µm particle size when measured according to ASTM D422-07. In another embodiment, the particle size distribution of the dolomite has a particle size distribution with more than 90 wt. % being less than a Tyler Equivalent 100-mesh screen and less than 15 wt. % being less than a 15.8 µm particle size. In yet another embodiment, particle size distribution of the dolomite has with more than 95 wt. % being less than a Tyler Equivalent 100-mesh screen and less than less than 15 wt. % being less than a 36.2 µm particle size.

The light-burn grade dolomite particle size distribution, in at least one embodiment, has more than 85 wt. % being less than a Tyler Equivalent 100-mesh screen and less than 15 wt. % being less than a 4.8 µm particle size when measured according to ASTM D422-07. In another embodiment, the particle size distribution of the light-burn grade dolomite has a particle size distribution with more than 90 wt. % being less than a Tyler Equivalent 100-mesh screen and less than 15 wt. % being less than a 15.8 µm particle size. In yet another embodiment, the particle size distribution of the light-burn grade dolomite has with more than 95 wt. % being less than a Tyler Equivalent 100-mesh screen and less than less than 15 wt. % being less than a 36.2 µm particle size.

In another embodiment, there is a surprising synergy between a relatively rapid heating rate and the ultimate heating temperature, with the objective of maximizing the formation of magnesium oxide while minimizing the calcium oxide formed. Other process parameters, such as particle size and surface area, and the mineral mixture of the source material play roles in this surprising synergy. One surrogate measure of the synergy is the amount of carbon dioxide and other mass components being driven off the raw materials during calcining.

During the calcining of the light-burn grade dolomite, in at least one embodiment, the light-burn grade dolomite experiences a weight loss ranging from 23-28 dry weight percentage relative to an uncalcined dolomite. In another embodiment, the light-burn grade dolomite experiences a weight loss ranging from 24-27 dry weight percentage relative to an uncalcined dolomite. In yet another embodiment, the light-burn grade dolomite experiences a weight loss ranging from 25-26 dry weight percentage relative to an uncalcined dolomite. It is preferable that the weight loss measured be weight lost from magnesium-containing materials releasing carbon dioxide while forming magnesium oxide. In at least one embodiment, the carbon dioxide amount released from magnesium-containing materials ranges from 60 wt. % of the total weight loss to 95 wt. % of the total weight loss. In another embodiment, the carbon dioxide amount released from magnesium-containing materials ranges from 70 wt. % of the total weight loss to 90 wt. % of the total weight loss. In another embodiment, the carbon dioxide amount released from magnesium-containing materials ranges from 75 wt. % of the total weight loss to 85 wt. % of the total weight loss.

In another embodiment, the carbon dioxide amount released from magnesium-containing materials ranges from 70 wt. % to 120 wt. % of the stoichiometric maximum weight loss of magnesium carbonate. An exemplary calculation of the stoichiometric maximum weight loss is as follows: in at least one embodiment, a dolomite blend includes 51 wt. % calcium carbonate ($CaCO_3$) and 42 wt. % magnesium carbonate ($MgCO_3$). The molar mass of $CaCO_3$ is 100 g and CaO is 56 g. The molar mass of $MgCO_3$ is 84.5 g and for MgO is 40 g. In a 100 g sample of a representative blend of dolomitic materials, there is 42 g of $MgCO_3$. After a heating time period, the dolomite magnesium theoretically decomposes only $MgCO_3$ to only MgO, the sample would weigh 40/84.5 of the original amount 47.3% of the original $MgCO_3$ mass or 19.9 g MgO. The resultant weight of light-burn grade dolomite is, therefore, only (51+19.9)/(51+42) or 76% of the original weight. Stated as the stoichiometric loss of carbon dioxide, i.e. 100 wt. %-76 wt. %, that is 24 wt. % loss. In another embodiment, the carbon dioxide amount released from magnesium-containing materials ranges from 80 wt. % to 110 wt. % of the stoichiometric maximum mass loss of magnesium carbonate. In another embodiment, the carbon dioxide amount released from magnesium-containing materials ranges from 90 wt. % to 105 wt. % of the stoichiometric maximum mass loss of magnesium carbonate.

Calcining of the dolomite may occur using heating techniques known in the art. Non-limiting examples of heating techniques include a static oven method, a static oven method with preheating, a calciner method, a calciner process with preheating, a dielectrically-heated method, and a microwave-heated method.

It was surprising that the light-burn grade dolomite, when formed into the magnesium cement, experienced reduced tensile strength by as much as 50% relative to the magnesium cement formed with the light-burn grade dolomite that did not experience a weight loss as in the ranges above.

It is understood that while the examples have been presented in embodiments involving dolomite, other magnesium-containing minerals are suitable for use in certain other embodiments without exceeding the scope and limitations of the contemplated invention. Non-limiting examples of other magnesium-containing materials include pyroxenite, amphibolite, serpentine, dunite, and chlorite.

In at least one embodiment, when a portion of calcium oxide is formed during calcining, especially above 1,000° C., the reaction of the calcium oxide with the metal silicate polymer can be hazardously exothermic. The excess calcium oxide can be retarded with a preliminary addition of water to form a hydrated lime ($Ca(OH)_2$) prior to mixing with the metal silicate polymer.

In at least one embodiment, the magnesium-containing material has chloride present in a maximum amount of 10 wt. % chloride content. In another embodiment, the magnesium-containing material has chloride present in a maximum amount of 5 wt. % chloride content. In another embodiment, the magnesium-containing material has chloride present in a maximum amount of 2 wt. %.

In another embodiment, the magnesium-containing material may be retarded using a set retarder such as boric acid or borax. In at least one embodiment, the retarded magnesium-containing material may be also un-retarded by addition of materials to neutralize or sequester the boron-containing compounds.

A dolomite cement mortar is formed from the light-burn grade dolomite, phosphate salt, a first latent hydraulic additive, a second latent hydraulic additive, water, and sand. The dolomite cement mortar is reacted with the metal silicate polymer to form the hybrid cement in at least one embodiment.

The dolomite cement mortar composition, in at least one embodiment, includes the formulation in Table 2, as follows, where the composition totals 100 wt. %:

TABLE 2

| Component | Minimum Wt. % | Maximum Wt. % |
|---|---|---|
| Light-Burn Grade Dolomite[1] | 24 | 39 |
| Potassium Dihydrogen Phosphate | 2.7 | 4.5 |
| First Latent Hydraulic Additive[2] | 19 | 30 |
| Second Latent Hydraulic Additive[3] | 1.3 | 2.5 |
| Sand[4] | 19 | 30 |
| Water | 9 | 15 |

[1]Raw Dolomite supplied by Osborne Materials Co., Drummond Island, MI
[2]Ground Granulated Blast-Furnace Slag (GGBFG)
[3]Silica Fume
[4]White silica sand-fine particle size In at least one embodiment, the reaction of the magnesium-containing material with the metal silicate is too rapid for good mixing. Unexpectedly, the rapid reaction results in damage to the molds, relatively poor workability, relatively low hardened strength, and relatively large granularity of the dolomite cement mortar. The addition of the GGBFG to the magnesium-containing material results in a relatively slower reaction rate, in at least one embodiment. In addition, having the GGBFG in the composition lowers the heat of hydration and lower temperature increases during the mixing of the dolomite cement mortar in certain embodiments. GGBFG, in certain embodiments, also reduces the occurrence of microcracking in the dolomite cement mortar because of reduced thermal gradients during the curing of the dolomite cement mortar.

The metal silicate polymer, at least one embodiment, is formed by an inorganic polymerization reaction at the nano-structure condition in a gelled state using a relatively low temperature regime of less than 100° C. Such a condition leads to formation of longer inorganic chains and loosely cross-linked chains in acidic regimes with elevated reagent concentrations. Rings, cluster networks, and cages are included in the basic regimes with relatively low reagent concentrations. In at least one embodiment, a silica-containing compound is reacted with a hydroxide anion using a water glass reaction at relatively high reagent concentrations in a very basic pH regime defined by 3.7 wt. % anhydrous sodium hydroxide anion to form an aluminum silicate inorganic polymer. The silica-containing compounds include silicates known in the art to be wastes without many current use applications. Non-limiting examples of silicate-containing compounds include a municipal incineration ash, a biomass ash, a silicate glass, a ground glass, mine tailings, and mixtures thereof. Non-limiting examples of biomass ash include ash from combustion of rice, husks, straw, algae, or switchgrass. Non-limiting examples of the silicate glass include sodium silicate, fly ash, class C fly ash, class F fly ash, silica fume, high-reactivity metakaolin, blast furnace slag, and bottom ash, especially bottom ash ground to an average particle size ranging from less than 100 Tyler mesh to 4.8 μm. The unexpected ability to use bottom ash is advantageous despite its relative inertness, especially because of the large amount of essentially unusable bottom ash waste material that is available.

In at least one embodiment, the hydroxide anion is present in an amount ranging from 7 weight percent in solution to a saturated hydroxide anion solution. Non-limiting examples of hydroxide anion include sodium hydroxide anion, ammonium hydroxide anion, magnesium hydroxide anion and calcium hydroxide anion, preferably calcium hydroxide formed by hydration of calcium oxide in the magnesium-containing material. Use of calcium oxide or hydroxide anion from the magnesium-containing material is unexpectedly advantageous in reducing cost and the use of low-value materials in forming the metal silicate polymer when the polymer is combined with the magnesium-containing material. The hydration of calcium oxide surprisingly transformed the excessive amount and rate of energy released when amounts of calcium oxide are reacted with the phosphate salts into a useful source of hydroxide anion with an acceptably lower amount and controllable rate of energy release during the reaction. In at least one embodiment, calcium oxide in the light-burn grade dolomite is present at less than 5 wt. % of the light-burn grade dolomite. In another embodiment, calcium oxide in the light-burn grade dolomite is present at less than 9.5 wt. % of the light-burn grade dolomite.

In at least one embodiment, the metal silicate polymer is present in an amount ranging from 65 wt. % to 97 wt. % of the metal silicate polymer composition. In another embodiment, the metal silicate polymer is present in an amount ranging from ranging from 75 wt. % to 93 wt. % of the metal silicate polymer composition. In yet another embodiment, the metal silicate polymer is present in an amount ranging from 80 wt. % to 90 wt. % of the metal silicate polymer composition. A non-limiting example of the metal silicate polymer includes an aluminosilicate inorganic polymer.

In at least one embodiment, the metal silicate polymer composition is given in the range in Table 3, as follows, where the composition totals 100 wt. %:

TABLE 3

| Component | Minimum Wt. % | Maximum Wt. % |
|---|---|---|
| Strong Base[1] | 2.8 | 4.5 |
| Supplementary Cementitious Material Accelerator[2] | 6.5 | 10.5 |
| Silicate[3] | 20 | 37 |
| Second Latent Hydraulic Additive[4] | 2 | 3.5 |
| Sand[5] | 35 | 55 |
| Water | 9 | 15 |

[1]Sodium Hydroxide anion, anhydrous
[2]A complex amorphous structure composition having long-range order including aluminum atoms, silicon atoms, and oxygen atoms, including the metakaolin
[3]A silicate-calcium oxide source: Class F Flyash supplied by Boral Material Technologies, San Antonio, TX
[4]Silica Fume
[5]White silica sand-fine particle size In at least one embodiment, an additive is included in the hybrid magnesium cement composition or components thereof. Non-limiting examples of the additive include a supplemental oxide, such as an iron oxide; a chemical activator, such as sodium sulfate; a superplasticizer, such as a sulfonated composition; a lightening agent, such as cenospheres; a foaming agent, such as an inorganic foaming agent; a stabilization agent; a fiber reinforcement, such as a short fiber or a continuous fiber; and a filler, such as a sand and/or an aggregate filler forming a hybrid magnesium concrete.

In at least one embodiment, when MOP is reacted with the metal silicate polymer, a silicon phosphate, a non-limiting example of which is $SiP_2O_7$ that forms as a crystal. In at least one embodiment, the crystal is a needle-shaped crystal having a relatively long chain length. The malleability of MOP with the needle-shaped crystal significantly exceeds the malleability observed in the art with relatively short chain crystals of $SiP_2O_7$.

In at least embodiment, the silicon phosphate is present in an amount of less than 3 wt. % of the silicon phosphate crystal. In another embodiment, the silicon phosphate is present in an amount ranging from 0.1 wt. % to 2 wt. %. Without being confined to any one theory, the silicon phosphate allows slippage along the inorganic polymer chain, advantageously improving the malleability of the hybrid cement relative to Portland cement's ultimate compressive strain capacity of less than 0.3%. In at least one embodiment, the hybrid cement has an ultimate compressive strain capacity ranging from 0.5% to 3%. In another embodiment, the hybrid cement has an ultimate strain capacity ranging from 0.8% to 2.5%.

A soluble phosphate salt may be ground and mixed in with the dry hybrid magnesium-containing cement composition, forming shotcrete-dry mix, in at least one embodiment. In another embodiment, the soluble phosphate salt may be dissolved in water which is then mixed with the dry hybrid magnesium cement composition forming shotcrete-wet mix. It is surprising that the soluble phosphate salt accelerates the polymerization of the hybrid magnesium cement composition to a point where the mixture is unworkable after a time period ranging from 30 seconds to 5 minutes. The amount of phosphate salt in at least one embodiment, ranges from 0.5 weight percent to 20 weight percent of the hybrid magnesium cement composition. In another embodiment, the phosphate salt is present in an amount ranging from 2 weight percent to 15 weight percent of the hybrid magnesium cement composition. In yet another embodiment, the phosphate salt is present in an amount ranging from 5 weight percent to 10 weight percent of the hybrid magnesium cement composition.

In at least one embodiment, the reinforcement includes a short fiber having a length ranging from 0.06 inches to 1 inch. In another embodiment, the short fiber has a length ranging from 0.25 inch to 0.75 inch. In another embodiment, reinforcement includes a continuous fiber including a woven reinforcement and/or a nonwoven reinforcement.

In at least one embodiment, the reinforcement includes a fiber having a metal composition. In another embodiment, the reinforcement includes a fiber having a ceramic composition, such as a glass fiber. In yet another embodiment, the reinforcement includes a fiber having an organic composition, such as a natural fiber, an aramid fiber, a carbon fiber, a polypropylene fiber or a nanotube.

In at least one embodiment, the reinforcement includes a crenulated fiber. In another embodiment, reinforcement includes a milled fiber. In yet another embodiment, the reinforcement includes an extruded fiber.

In at least one embodiment, aggregate is added with the sand to form a magnesium concrete. In at least one embodiment, the aggregate is gravel. The aggregate, in at least one embodiment, is added to the magnesium cement composition in an amount ranging from 25 volume percent to 50 volume percent of the magnesium cement composition before the sand and aggregate is added. In another embodiment, the aggregate is added to the magnesium cement composition in an amount ranging from 35 volume percent to 45 volume percent.

In at least one embodiment, the ratio of sand to gravel in the magnesium cement composition ranges from 0.5 to 0.75. In another embodiment, the ratio of sand and gravel in the magnesium cement composition ranges from 0.6 to 0.7. In at least one embodiment, when the magnesium cement composition, sand, and gravel are mixed the magnesium concrete is formed.

EXAMPLES

Example 1

A sample magnesium-containing cement mortar is prepared with 1 part magnesium oxide in a light-burn grade dolomite, 1 part GGBFS, and 0.1 part tripotassium phosphate. A sample of a metal silicate polymer is prepared with 1 part Class F fly ash, and 0.13 parts sodium hydroxide anion. Between the magnesium-containing cement mortar and the metal silicate polymer, 1.9 parts of sand, 0.15 parts of silica, and 0.73 parts of water are dispersed. The mixture is mixed thoroughly forming a hybrid magnesium-containing cement sample composition. The hydration mechanism is not fully understood in this case, but is known to be different than the hydration mechanism of Portland cement.

Example 2

The composition of Example 1 is cast into 40 mm×40 mm×40 mm molds. The samples are demolded after 24 hours. After three days, the compressive strength is measured at 35

MPa when tested to failure at a constant cross-head speed of 0.001 mm/sec according to test method ASTM C773-88 (2011). After two weeks, the compressive strength achieves 50 MPa with a variability of +/−15%. The ultimate strain of the samples ranges from 1.0 % to 2.0%, which is at least three times the ultimate strain of Portland cement. While not wishing to be bound by any one theory, the increase in ultimate strain, i.e. the malleability, is believed to be the result of the formation of needle-like crystals of $SiP_2O_7$ having unexpectedly long polymeric chains.

Example 3

The composition of Example 1 is cast as a 3 mm plate. Short fibers, having an average length ranging from 1.6 mm to 60 mm, are added to Example 1 and are present in an amount ranging from 0.1 vol. % to 2 vol. %.

Example 4

The composition of Example 1 is cast as a 3 mm plate. Continuous fibers, having an average length ranging greater than 60 mm, are added to Example 1 and are present in an amount ranging from 0.1 vol. % to 5 vol. %.

Example 5

The samples of Examples 3 and 4, i.e. magnesium-containing hybrid cements made with fibers unexpectedly show an ability to sustain increasing loads beyond the first crack strength, thereby failing progressively rather than catastrophically. The failure appears to be more like the yielding of steel and is classified as pseudo-strain hardening. Catastrophic failure is typically expected of ceramics like the hybrid magnesium-containing cement.

Example 6

Samples having the composition of Table 2, but with a weight ratio of potassium dihydrogen phosphate to dolomite of 0.3, are calcined and tested for compressive strength. The tests show that the maximum strength observed is achieved at 900° C., and decreases as the dolomite is calcined at 1,000° C., as shown in Table 4.

TABLE 4

| Calcining Temperature (° C.) | Average Compressive Strength (MPa)[1] |
|---|---|
| 0 | 0 |
| 600 | 1.2 |
| 750 | 1.3 |
| 900 | 6.7 |
| 1,000 | 3.8 |

[1]Measured after 24 hr

Example 7

Samples having the composition of Table 2, but with a weight ratio of potassium dihydrogen phosphate to dolomite ranging from 0.1 to 0.9, are calcined at 900° C. and tested for compressive strength. The tests show that the maximum strength observed is achieved when the weight ratio is between 0.3 and 0.9 as shown in Table 5.

TABLE 5

| Weight Ratio of $KH_2PO_4$ to dolomite | Average Compressive Strength (MPa)[1] |
|---|---|
| 0.1 | 1.5 |
| 0.2 | 4.8 |
| 0.3 | 6.7 |
| 0.9 | 6.2 |

[1]Measured after 24 hr

Figure 2:
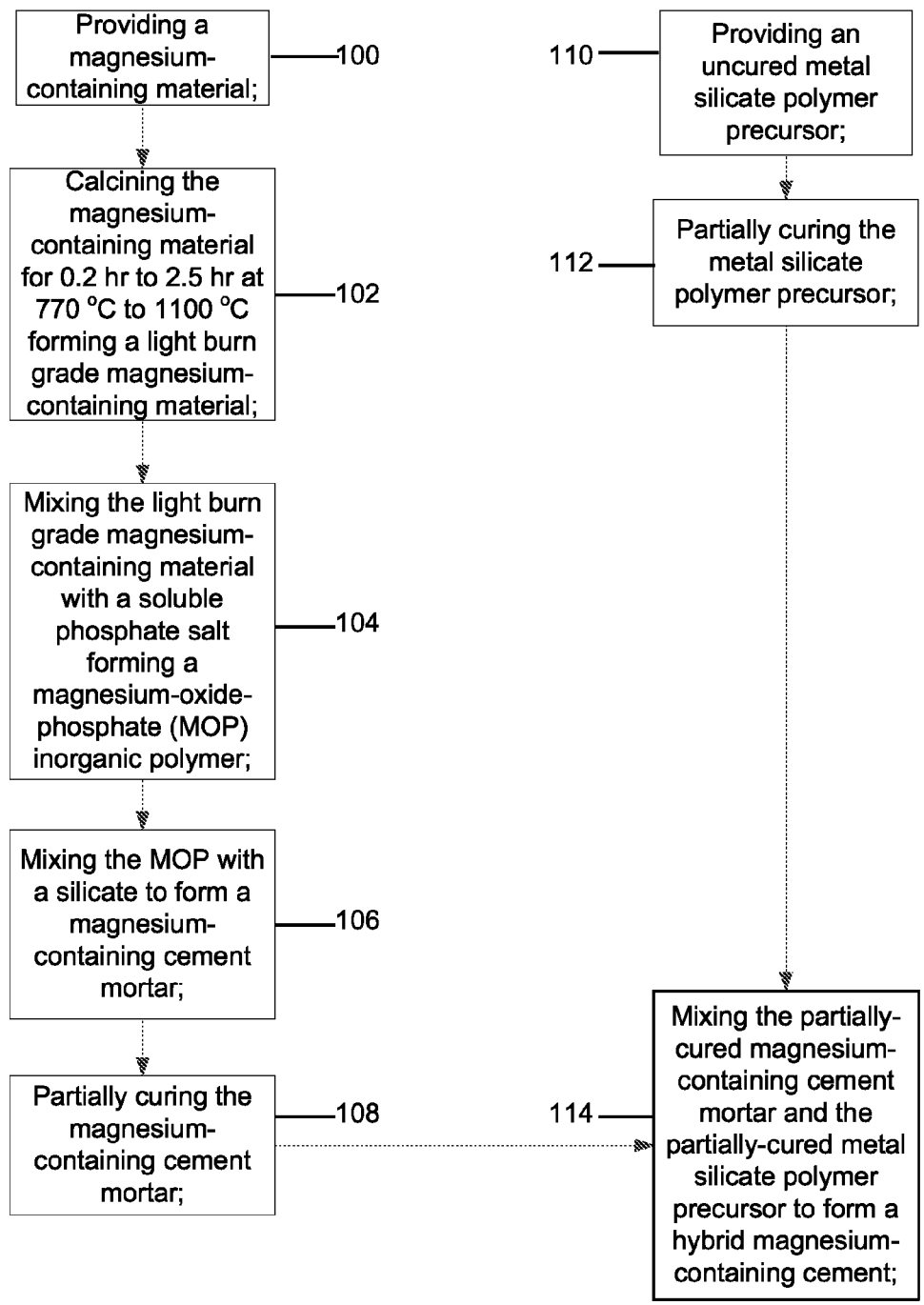
FIG. 2 diagrammatically illustrates a method of making a hybrid magnesium-containing cement according to at least one embodiment.

Turning now to FIG. 2, a method of manufacture of a hybrid magnesium-containing cement mortar is diagrammatically illustrated according to at least one embodiment. In step 100, the magnesium-containing material, such as the dolomite, is provided. In step 102, the magnesium-containing material is calcined at 770° C. to 1,100° C. for 0.2 hours to 2.5 hours forming the light-burn grade magnesium-containing material. In step 104, the light-burn grade magnesium-containing material is mixed with the soluble phosphate salt forming the MOP. In step 106, the MOP is mixed with a silicate to form the magnesium-containing cement mortar without water. In step 108, magnesium-containing cement mortar is partially cured as result of mixing with water forming a partially-cured magnesium-containing cement mortar. In step 110, an uncured metal silicate polymer precursor is provided, such as the formulation in Table 3 without the water. Upon addition of water, in step 112, the metal silicate polymer precursor partially cures forming a partially-cured metal silicate polymer. In step 114, the partially-cured magnesium-containing cement mortar and the partially-cured metal silicate polymer are mixed to form the hybrid magnesium-containing cement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A magnesium-containing material composition, comprising:
   calcium carbonate present in an amount ranging of 30 wt. % to 70 wt. % of the magnesium-containing material composition;
   calcium oxide in an amount less than 10 wt. % of the magnesium-containing material composition;
   magnesium carbonate in an amount less than 25 wt. % of the magnesium-containing material composition; and
   magnesium oxide present in an amount ranging from 18 wt. % to 70 wt. % of the magnesium-containing material composition, wherein the composition totals 100 wt. % of the magnesium-containing material composition, excluding other components.

2. The magnesium-containing material composition of claim 1, comprising:
   calcium carbonate present in an amount from 40 wt. % to 65 wt. % of the magnesium-containing material composition;
   calcium oxide present in an amount from 0.1 wt. % to 7.5 wt. % of the magnesium-containing material composition;
   magnesium carbonate in an amount less than 10 wt. % of the magnesium-containing material composition; and
   magnesium oxide present in an amount from 30 wt. % to 60 wt. % of the magnesium-containing material composition, wherein the composition totals 100 wt. % of the magnesium-containing material composition, excluding other components.

3. The magnesium-containing material composition of claim 1, comprising:
   calcium carbonate present in an amount from 50 wt. % to 60 wt. % the magnesium-containing material composition;
   calcium oxide present in an amount from 0.2. wt. % to 5 wt. % of the magnesium-containing material composition;
   magnesium carbonate in an amount less than 5 wt. % of the magnesium-containing material composition; and
   magnesium oxide present in an amount from 40 wt. % to 50 wt. % of the magnesium-containing material composition, wherein the composition totals 100 wt. % of the magnesium-containing material composition, excluding other components.

4. The magnesium-containing material composition of claim 1, further comprising sand.

* * * * *